No. 859,717. PATENTED JULY 9, 1907.
G. F. ZINN.
DOUGHNUT FRYING MACHINE.
APPLICATION FILED DEC. 17, 1906.
2 SHEETS—SHEET 1.
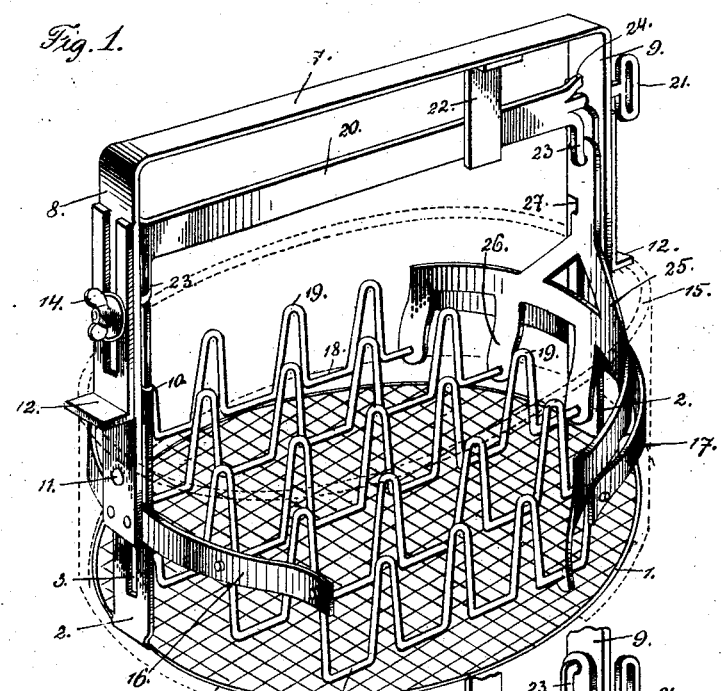
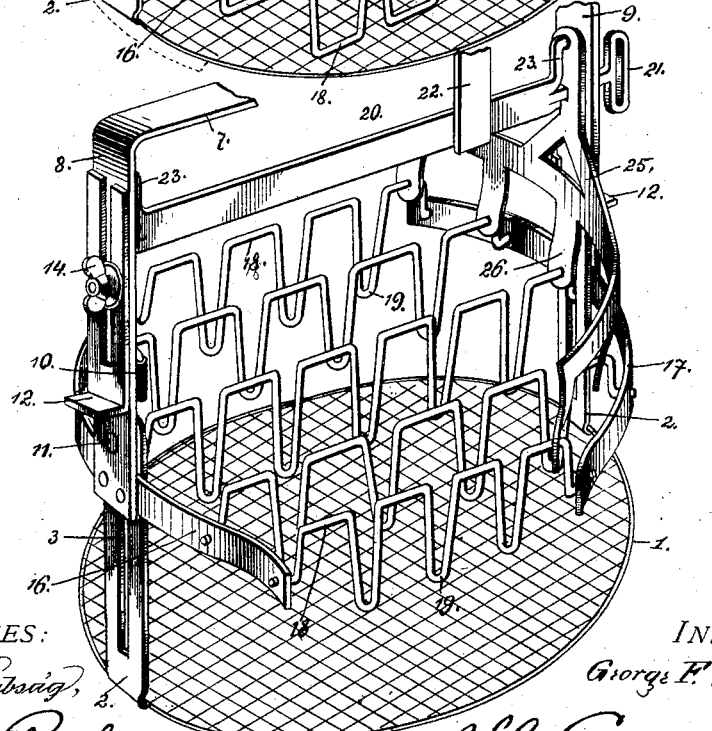
WITNESSES:
INVENTOR
George F. Zinn,
By N. C. Everitt & Co.
Attorneys

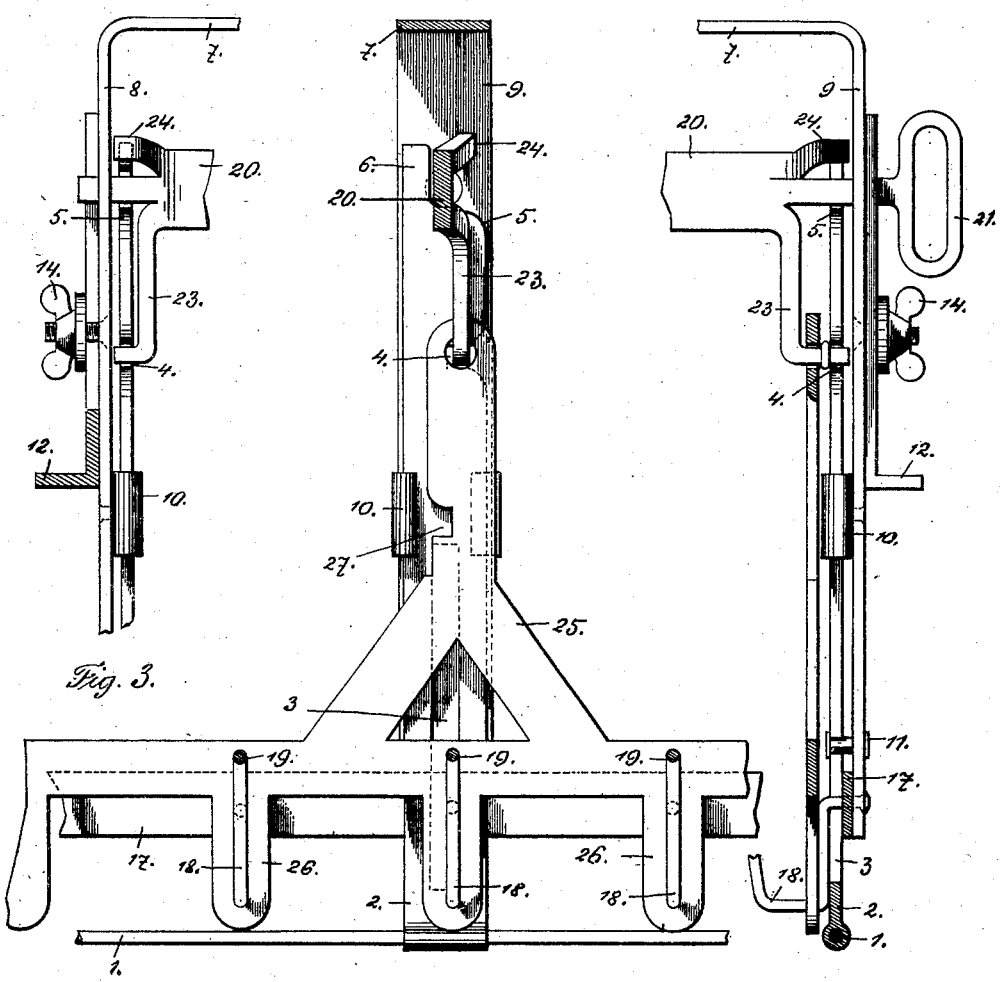

UNITED STATES PATENT OFFICE.

GEORGE F. ZINN, OF DERRY, PENNSYLVANIA.

DOUGHNUT-FRYING MACHINE.

No. 859,717.        Specification of Letters Patent.        Patented July 9, 1907.

Application filed December 17, 1906. Serial No. 348,220.

*To all whom it may concern:*

Be it known that I, GEORGE F. ZINN, a citizen of the United States of America, residing at Derry, in the county of Westmoreland and State of Pennsylvania, have invented certain new and useful Improvements in Doughnut-Frying Machines, of which the following is a specification, reference being had therein to the accompanying drawing.

This invention relates to cooking utensils, and the invention relates more particularly to a utensil for use in cooking doughnuts or similar cakes.

The invention has for its object to provide a novel utensil for supporting, temporarily holding, and turning or reversing doughnuts in a suitable receptacle.

My invention aims to provide a utensil having adjustable means, whereby the same can be supported in an elevated position within a suitable cooking receptacle.

In connection with my improved utensil, I employ positive and reliable means for temporarily holding or separating doughnuts while they are being cooked upon one side said means being constructed whereby it may be easily and quickly actuated to turn or reverse the doughnuts whereby they may be cooked upon the opposite side.

To this end, my invention embodies an adjustable elevated perforated tray adapted to be supported in a receptacle. The tray is provided with an extension handle or bail, which permits of the perforated bottom or section thereof being lowered, when it is desired to bodily remove doughnuts therefrom. Operatively mounted upon the tray, and connecting with the movable bottom or section thereof is a reversing or turning frame, which is adapted to lie in engagement with the bottom of the tray, while doughnuts are being cooked upon one side and which is reversed to turn the doughnuts and hold them upon the bottom of the tray while their opposite sides are being cooked.

In constructing my improved utensil, I have employed a simple, durable and inexpensive mechanism, easily operated and adapted to simplify the art of cooking doughnuts.

The detail construction entering into my improved utensil will be presently described and then specifically pointed out in the appended claims.

Referring to the drawing forming part of this specification, like numerals of reference designate corresponding parts throughout the several views, in which:

Figure 1 is a perspective view of my improved utensil as supported in a receptacle, the receptacle being illustrated in dotted lines, Fig. 2 is a similar view of the utensil, partly broken away, illustrating the frame thereof in a reverse or turned position and the tray of the utensil lowered to permit of doughnuts being removed, Fig. 3 is an elevation of a portion of the handle or bail of the utensil, and the mechanism for moving a part of the same, Fig. 4 is a vertical sectional view of a portion of the utensil, Fig. 5 is an elevation of the same.

To put my invention into practice, I provide a perforated bottom or tray 1, preferably circular in plan. The sides of the bottom or tray 1 at diametrically opposite points are provided with standards 2 having slots 3 formed therein. The edges of the standards contiguous to their upper ends are notched, as at 4, while their ends are beveled, as at 5, and provided with upwardly extending lugs 6.

A handle or bail 7 is provided, the depending side arms 8 and 9, of which are slidably connected to the standards 2 by guides 10 and rivets 11, said guides embracing the edges of the standards, while the rivets 11 extend through the slots 3 of said standards. The side arms 8 and 9 are provided with slotted brackets 12, said brackets being adjustably connected to the side arms 8 and 9 by winged thumb nuts 14. The brackets 12 are adapted to support the tray or bottom 1 in an elevated position within a receptacle 15, said receptacle being illustrated in Fig. 1 of the drawings in dotted lines with the brackets 12 resting upon the upper edges of the receptacle. By means of the movable brackets 12 the height at which the bottom or tray 1 is suspended above the bottom of the receptacle 15 can be quickly regulated.

Secured to the lower ends of the arms 8 and 9, is the reversing or turning frame of my improved utensil, said frame consisting of two curved bars 16 and 17, these bars extending around approximately one-half the circumference of the perforated bottom or tray 1. Journaled in the curved bars 16 and 17 are a plurality of wire frames 18, each frame comprising a plurality of tapering retainers 19 over which doughnuts are placed, said retainers separating and temporarily holding doughnuts upon the perforated bottom or tray 1, while they are being cooked.

In the arms 8 and 9 of the handle or bail 7 is journaled a rectangular shaft or bar 20, the end of said shaft or bar protruding through the arm 9 and the slot of bracket 12 where it is provided with a suitable handle or knob 21, to permit of the shaft or bar being partially rotated. Bearing against the side of the shaft or bar is a flat spring 22, carried by the handle or bail 7, said spring normally maintaining the shaft or bar in the fixed position, to which it has been moved. The ends of the shaft or bar 20 are split to provide frame elevating arms 23, and frame reversing or turning arms 24. One of the elevating arms 23 is connected to the fork 25, the prongs 26 of said fork engaging the wire frames 18 journaled in the bars 16 and 17.

The normal position of my utensil within recaeptacle is illustrated in Fig. 1 of the drawings and in describing the manner of manipulating the utensil I will assume that the perforated bottom or tray 1 is immersed in boiling lard contained in the receptacle 15, and that a doughnut has been placed on each one of the retainers 19 of the frame 18. The doughnuts will be prevented from contacting with one another, which is injurious to perfectly formed doughnuts, and will be allowed to float in the boiling lard until their under sides have become cooked. To invert the doughnuts, the handle or knob 21 is rotated, half a revolution. A half rotation of the shaft or bar 20 simultaneously reverses or turns the doughnuts and lowers the perforated bottom or tray 1, this being necessary to clear the movement of the retainers 19. These movements are accomplished by the elevating arms 23 releasing the standards 2, said arms having supported said standards by engaging in the recesses 4 thereof. Immediately upon the standards 2 being released the perforated bottom or tray 1 drops, being limited in its movement by the rivets 11 engaging the upper end wall of the slots 3 of the standards 2. A further movement of the shaft or bar 20 causes one of the elevating arms 23 to raise the fork 25 the first movement of the fork placing the frames 18 horizontal. A further rotation of the shaft or bar 20 completely reverses or turns the frames 18, the retainers 19 of said frames holding the doughnuts during this operation. The perforated bottom or tray 1 is now a considerable distance from the frames 18 and the doughnuts are maintained in engagement with the retainers 19 by the boiling lard within the receptacle 15. The doughnuts having been thoroughly cooked, the utensil is removed bodily from the receptacle 15, the doughnuts being supported by the perforated bottom or tray 1, and by tilting the utensil, the doughnuts can be easily removed from the utensil. The utensil is now placed upon a table where the doughnuts are being formed, and as soon as a person releases the utensil the frame, including the handle or bail 7, frames 18 and fork 25 descend by gravity and return to their normal position. This is accomplished by the arms 25 engaging the lugs 6 of the standards 2, said arms being held until the fork 25 descends and the arms 23 engage in the recesses 4 of the standards 2. It is obvious that the lowering of the fork 25 returns the frames 18 to their normal position over the perforated bottom or tray 1. After doughnuts have been placed upon the retainers 19 the utensil is placed in the receptacle 15 and the under sides of the doughnuts cooked, after which the operation of reversing or turning the doughnuts is similar to that just described. The fork 25 is recessed as at 27 to clear the shaft or bar 20, when the frames 18 are reversed.

From the novel construction of my improved utensil it will be observed that considerable labor and trouble in connection with the cooking of doughnuts is obviated, it having been necessary heretofore to closely watch the cooking of doughnuts to prevent them from contacting with one another and prevent them from overcooking. It is obvious that when two of my improved utensils is being used in the receptacle 15, another one can be loaded with doughnuts, thereby providing a practically continuous operation of cooking doughnuts, which for various reasons, other than those above stated, has heretofore been impossible.

It is thought from the foregoing description taken in connection with the drawing, that the construction and operation of my improved utensil will be apparent without further description, and I desire it to be understood that such changes in the size, proportion, material and minor details, as are permissible by the appended claims, may be resorted to without departing from the spirit and scope of the invention.

What I claim and desire to secure by Letters Patent, is:—

1. A utensil of the character described, consisting of a perforated bottom or tray, slotted standards carried thereby, a bail slidably connected to said standards, adjustable brackets carried by the arms of said bail, curved bars carried by said bail, a plurality of wire frames journaled in said bars and having tapering retainers, a spring-held shaft or bar journaled in said bail and normally engaging said standards, a fork connecting with said shaft and with said frames, means to partially rotate said shaft or bar, and means carried by said shaft or bar for supporing said tray in an elevated position.

2. A utensil of the type described comprising a perforated bottom or tray, slotted standards carried thereby, a bail slidably connected to said standards, adjustable brackets carried by the arms of said bail, a plurality of wire frames movably supported by said bail, a shaft or bar journaled in said bail, means actuated by said shaft or bar, to release said tray, means actuated by said shaft or bar to move said wire frames, and means to normally hold said shaft or bar in a fixed position.

3. In a device of the type described, a perforated bottom or tray, a plurality of movable frames supported above said tray, a bail connecting with said tray, means carried by said bail for releasing said tray, and means carried by said bail to support said frames.

4. In a device of the type described, a perforated bottom or tray, a plurality of wire frames movably supported above said tray, each frame comprising a plurality of retainers adapted to be inverted by the movement of said frames, and means to move said frames.

5. In a device of the type described, a perforated movable bottom or tray, a plurality of wire frames movably supported above said bottom or tray, each frame comprising a plurality of retainers, a bail, means carried by said bail to move said frames, and means carried by said bail to support said bottom or tray.

6. A cooking utensil for doughnuts, comprising a temporarily supported tray, a bail, a plurality of wire frames movably mounted above the tray, means carried by said bail to invert said frames, and means carried by said bail to support said tray.

7. In a device of the type described, the combination of a tray, slotted standards rising from said tray, a bail having depending arms slidably-engaging said standards, supporting brackets carried by the arms of said bail, a shaft journaled in the arms of the bail, curved bars secured to said arms, doughnut-receiving frames journaled in said bars, and means engaging said frames and connected with said shaft for actuating the frames when the shaft is actuated.

8. In a doughnut frying machine, a tray, a pair of standards rising therefrom, a bail having depending arms slidably-connected to said standards, bars carried by said arms, a doughnut retaining frame journaled in said arms, an actuating shaft, and means connecting the shaft with said frame for actuating the latter when the shaft is operated.

9. In a doughnut frying machine, a doughnut retaining frame, embodying a wire formed intermediate its ends with a plurality of bends forming doughnut retainers, supporting means in which the ends of the wire are journaled and normally held with their bends projecting upwardly to support doughnuts thereon, and means for partially rotating the wire to invert the bends or retainers, as and for the purpose described.

10. In a doughnut frying machine, the combination of a perforated tray, a bail to which the tray is slidably-connected, a rotatable doughnut-retaining frame supported from the bail, an actuating-member, and means connecting the frame with the actuating-member for operating the frame when the actuating-member is operated.

11. In a doughnut frying machine, the combination with a perforated tray, and supporting-means to which the tray is movably-connected, of a doughnut-retaining member rotatably-mounted above the tray and lying in close relation thereto when the tray is in an elevated position, and means whereby a partial revolution of the retaining member is effected as the tray moves away from the supporting-means.

In testimony whereof I affix my signature in the presence of two witnesses.

GEORGE F. ZINN.

Witnesses:
    MAX H. SROLOVITZ,
    AGNES TRIGG.